United States Patent
Hong et al.

(10) Patent No.: US 7,020,950 B2
(45) Date of Patent: Apr. 4, 2006

(54) DISC BALANCING DEVICE

(75) Inventors: Soon-kyo Hong, Seoul (KR);
Chul-woo Lee, Kyungki-do (KR);
Seung-tae Jung, Kyungki-do (KR);
Sung-hoon Choa, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 511 days.

(21) Appl. No.: 09/955,061

(22) Filed: Sep. 19, 2001

(65) Prior Publication Data

US 2002/0040891 A1    Apr. 11, 2002

(30) Foreign Application Priority Data

Oct. 9, 2000   (KR) .............................. P2000-59309

(51) Int. Cl.
*G11B 5/127*   (2006.01)
*H04R 31/00*   (2006.01)

(52) U.S. Cl. ............................... 29/603.09; 29/603.03; 29/737; 219/121.69; 219/121.85; 360/98.08

(58) Field of Classification Search ............. 29/603.03, 29/603.09, 737; 360/98.08; 219/121.69, 219/121.85
See application file for complete search history.

(56) References Cited

U.S. PATENT DOCUMENTS

| | | | | |
|---|---|---|---|---|
| 3,538,298 A | * | 11/1970 | Clapp et al. ............ | 219/121.69 |
| 3,663,795 A | * | 5/1972 | Myer .................... | 219/121.68 |
| 4,096,988 A | * | 6/1978 | Scuricini ................ | 494/7 |
| 5,164,791 A | * | 11/1992 | Kubo et al. .............. | 356/494 |
| 5,762,663 A | * | 6/1998 | Asada ................... | 96/336 |
| 6,424,488 B1 | * | 7/2002 | Misso et al. ............. | 360/98.08 |
| 6,501,045 B1 | * | 12/2002 | Bernstein et al. ......... | 219/121.69 |

FOREIGN PATENT DOCUMENTS

| | | | |
|---|---|---|---|
| JP | 09293248 A | * | 11/1997 |
| JP | 10092095 A | * | 4/1998 |

OTHER PUBLICATIONS

"Characterization of disk vibrations on aluminum and alternate substrates"; McAllister, J.S.; Magnetics, IEEE Transactions on , vol.: 33 , Issue: 1 , Jan. 1997; pp.: 968-973.*

* cited by examiner

*Primary Examiner*—Paul D. Kim
(74) *Attorney, Agent, or Firm*—Stein, McEwen & Bui, LLP

(57) ABSTRACT

A disc balancing device and a method thereof. The disc balancing device includes a disc assembly having a driving source, and a disc rotatably disposed at the driving source, a displacement measurement unit measuring vibration in the rotation of the disc assembly, a phase angle measurement unit measuring a phase angle from a reference point of the disc assembly in the rotation of the disc assembly, an operation/control unit calculating an eccentric mass and an eccentric position of the disc assembly, by using the biased vibration measured in the displacement measurement unit and the phase angle measured in the phase angle measurement unit, and a laser cutter tracking and laser-cutting the side portion of the disc corresponding to the eccentric position according to the information from the operation/control unit, whereby the eccentric mass of the disc assembly is balanced to reduce vibration in the rotation.

7 Claims, 5 Drawing Sheets

DISC BALANCING DEVICE

CROSS-REFERENCE TO RELATED APPLICATION

This application claims the benefit of Korean Patent Application No. 00-59309 filed on Oct. 9, 2000 in the Korean Industrial Property Office, the disclosure of which is incorporated herein by reference.

BACKGROUND OF THE INVENTION

1. Field of the Invention

The present invention relates to a disc balancing device and a method thereof, and in particular to an improved disc balancing device which can balance an eccentric mass of a disc rotatably disposed at a driving source, and a method thereof.

2. Description of the Related Art

In general, a disc drive such as the HDD includes a housing consisting of a base and a cover, a disc positioned in the housing and rotated by a spindle motor at a high speed, and a head suspension assembly for storing data in the disc or reproducing the stored data. The head suspension assembly is positioned adjacent to the disc and controlled by a linear motor. Here, one end portion of the head suspension assembly supports a head. The movement of the head suspension assembly is precisely controlled.

On the other hand, the head suspension assembly is very sensitive to vibration or impact. When the head suspension assembly is considerably impacted, the head damages the disc surface. Especially, the precise control of the head suspension assembly is much influenced by vibration generated due to an eccentric mass of the disc in driving of the spindle motor. That is, when the vibrations are generated due to the eccentric mass of the disc, the head cannot precisely sense a track of the disc. Accordingly, when displacement of the rotated disc is varied due to the eccentric mass, it is impossible to precisely store and reproduce the data through the head.

This eccentric mass of the disc may be generated during the fabrication process of the disc. As shown in FIG. 1, the eccentric mass may also be generated due to an assembly tolerance when discs 5 and 6 are connected to a rotor 3. An exemplary method for balancing the eccentric mass will now be explained. Referring to FIG. 1, a plurality of discs 5 and 6 are positioned at the upper and lower portions of the rotor 3 of a spindle motor 1. Force F is applied to the outsides of the discs 5 and 6 in the symmetrical direction from the rotor 3. Therefore, the discs 5 and 6 are respectively adhered to the rotor 3 facing in the opposite direction. In this state, a clamping member 7 is connected to the rotor 3 to fix the discs 5 and 6 in place. This method is called a biasing method. As a result, the biasing method adjusts the eccentric mass of the disc resulting from an assembly tolerance. However, in the biasing method, the eccentric mass due to an assembly error can be corrected only when a plurality of discs are assembled. Conversely, it is impossible to correct the eccentric mass of a single disc itself. In addition, in the case that only one disc is installed, the biasing method cannot balance the disc.

Another exemplary disc balancing method will now be described with reference to FIG. 2. A clamp 7 having a plurality of holes 7a and the disc 6 are installed at the rotor 3. Thereafter, a sensing unit senses an eccentric position of the disc 6. A mass member 9 is inserted into the hole 7a corresponding to the eccentric position. The mass member 9 fixed to the hole 7a compensates for the eccentric mass of the disc 6. However, a few tens of mass members are required to be inserted into the holes 7a. Furthermore, the plurality of mass members require having different mass. Also, it is inconvenient for the operator to insert each mass member 9 into the hole 7a. Moreover, although various mass members are provided, there is a limit to the preciseness of control of the eccentric ass of the disc.

SUMMARY OF THE INVENTION

Accordingly, it is an object of the present invention to provide a disc balancing device which can precisely control an eccentric mass of a disc disposed at a spindle motor.

Another object of the present invention is to provide a disc balancing method which can precisely control an eccentric mass of a disc disposed at a spindle motor.

Additional objects and advantages of the invention will be set forth in part in the description which follows and, in part, will be obvious from the description, or may be learned by practice of the invention.

The foregoing objects of the present invention are achieved by providing a disc balancing device including a disc assembly having a driving source, and a disc rotatably disposed at the driving source; a displacement measurement unit measuring vibration in the rotation of the disc assembly; a phase angle measurement unit measuring a phase angle from a reference point of the disc assembly in the rotation of the disc assembly; an operation/control unit calculating an eccentric mass and the eccentric mass position of the disc assembly, by using the biased vibration measured in the displacement measurement unit and the phase angle measured in the phase angle measurement unit; and a laser cutter tracking and laser-cutting the side portion of the disc corresponding to the eccentric mass position according to the information from the operation/control unit, whereby the eccentric mass of the disc assembly is balanced to reduce vibration in its rotation.

The disc balancing device further includes a dust inhaler inhaling dust generated when the side portion of the disc is cut by the laser cutter. Here, the dust inhaler and the laser cutter are moved by a robot unit controlled by the operation/control unit, tracking the eccentric mass position.

Advantageously, the phase angle measurement unit is a photo sensor measuring the phase angle by irradiating light to the reference point and receiving a reflected light from the disc assembly.

It is a further object of the present invention to provide a method of balancing a disc to reduce vibration due to an eccentric mass of the disc in the rotation of the disc rotatably disposed at a driving source, the disc balancing method includes the operations of: preparing a disc assembly having the driving source and the disc; rotating the disc assembly, and simultaneously measuring an initial vibration due to the eccentric mass of the disc assembly by using a displacement measurement unit; measuring a phase angle from a reference point of the rotated disc assembly by using a phase angle measurement unit; calculating the eccentric mass and position of the disc assembly according to the initial vibration and phase angle from an operation/control unit; and cutting the side portion of the disc corresponding to the eccentric position calculated in the operation/control unit according to the calculated eccentric mass with the aid of a laser cutter.

The disc balancing method further includes inhaling dust generated when the side portion of the disc is cut with the aid of a dust inhaler.

In addition, the disc balancing method further includes the operations of: re-measuring vibration of the disc assembly after the cutting of the side portion of the disc; and comparing the measured vibration with a predetermined reference value. If the measured vibration is greater than the reference value, operations of the rotating, measuring, calculating and cutting are repeated until the measured vibration is smaller than the reference value. Here, the laser cutter is moved by a robot unit controlled by the operation/control unit. The dust inhaler may also be moved by a robot unit that may be controlled by the operation/control unit.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Figure 1:
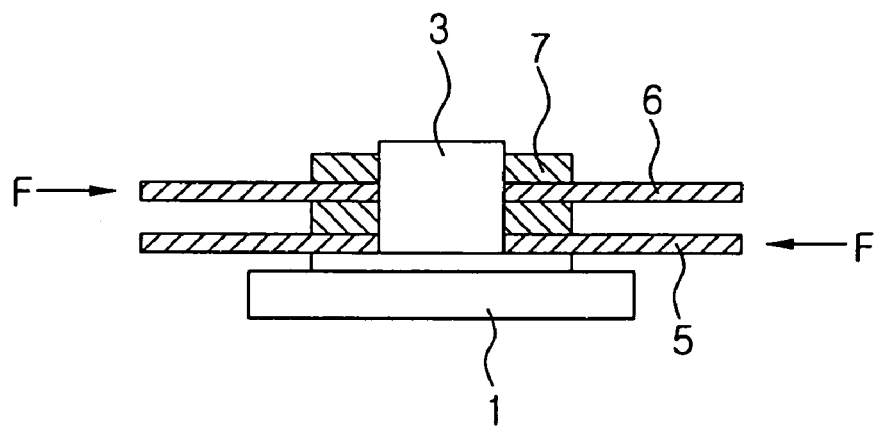
FIGS. 1 and 2 are schematic diagrams illustrating conventional disc balancing methods, respectively.
Figure 2:
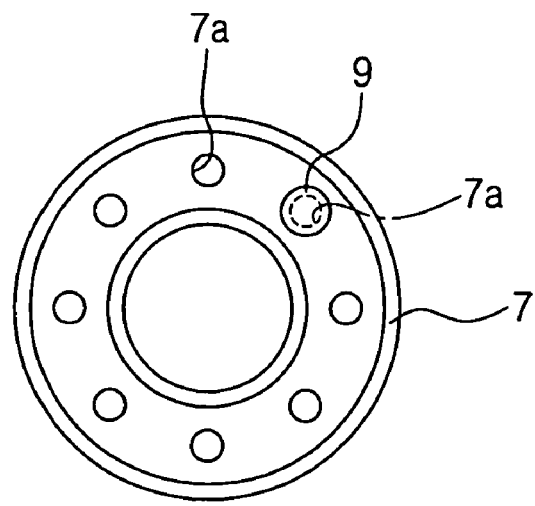

Reference will now be made in detail to the preferred embodiments of the present invention, examples of which are illustrated in the accompanying drawings, wherein like reference numerals refer to like elements throughout.

Figure 3:
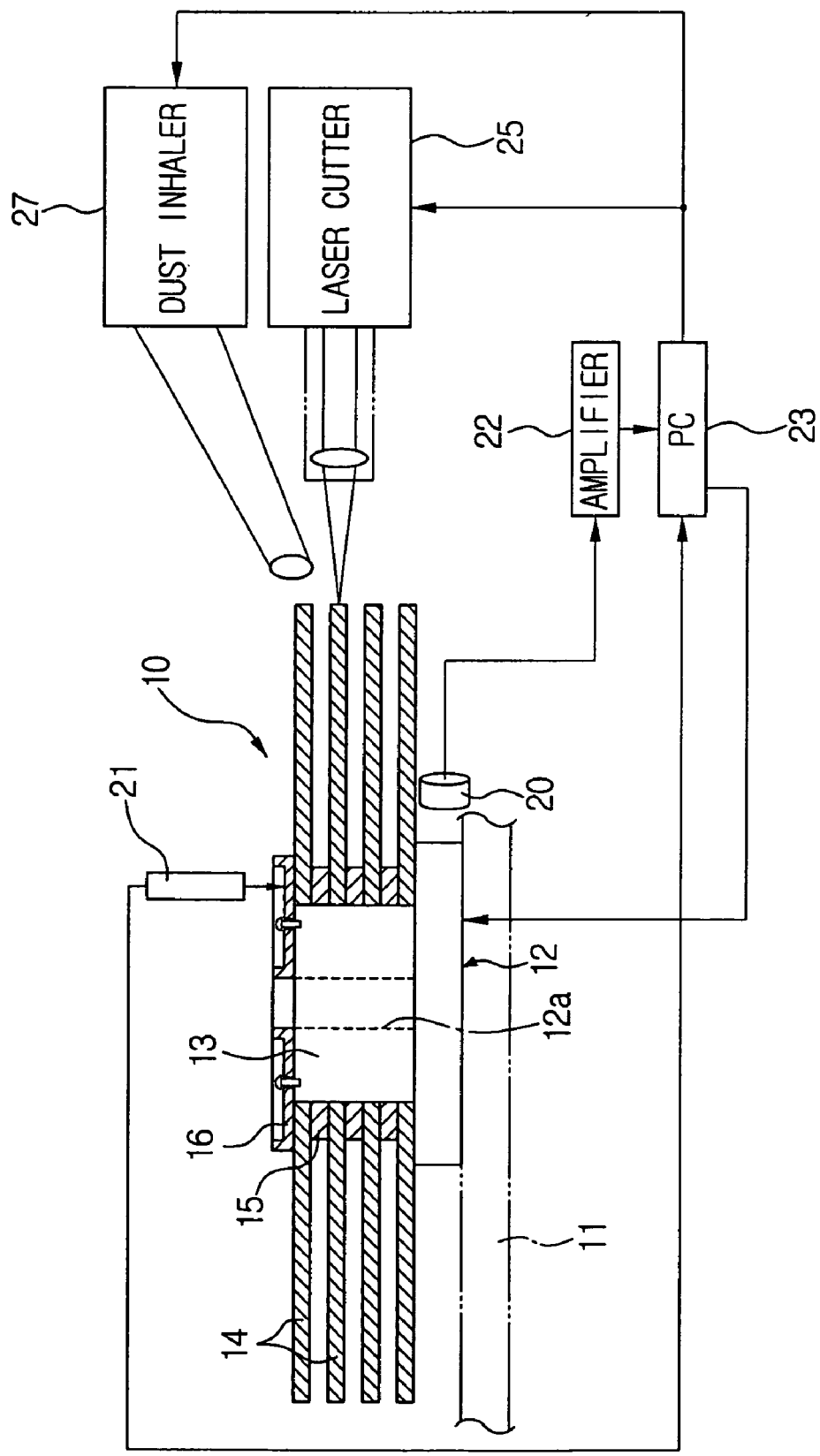
FIG. 3 is a schematic diagram illustrating the structure of a disc balancing device in accordance with an embodiment of the present invention.

Referring to FIG. 3, a disc balancing device in accordance with the present invention includes a disc assembly 10, a displacement measurement unit 20 measuring vibration in the rotation of the disc assembly 10, a phase angle measurement unit 21, an operation/control unit 23, and a laser cutter 25.

Figure 4:
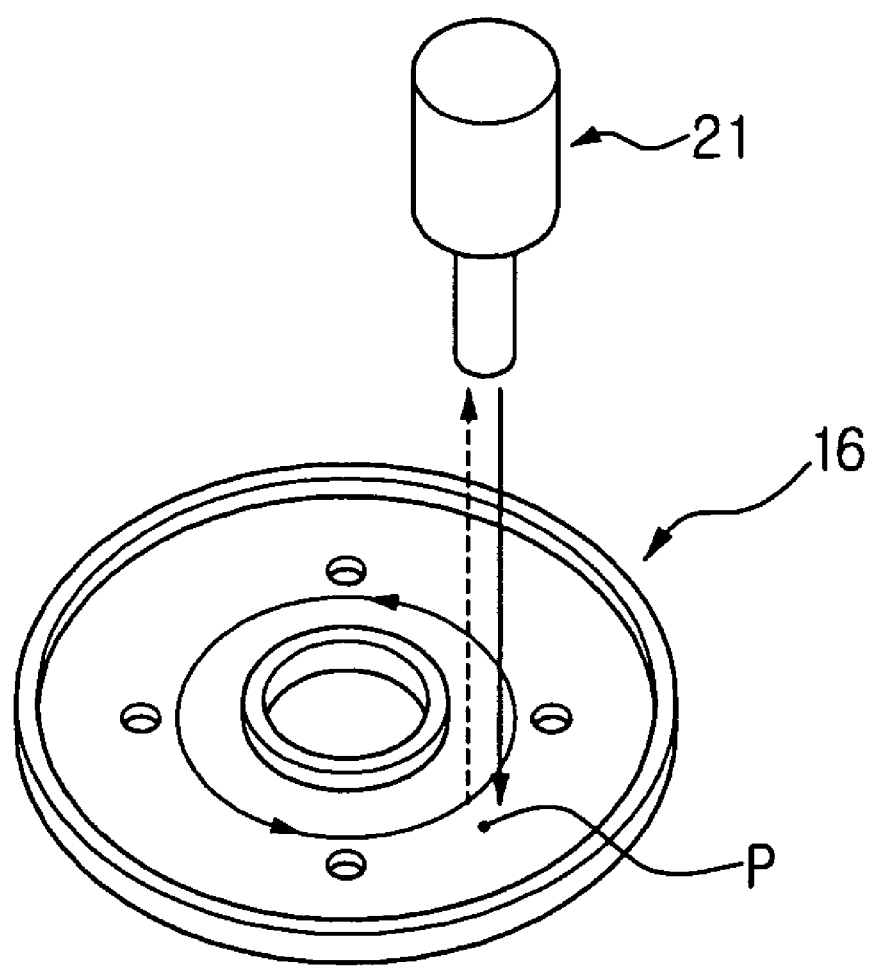
FIG. 4 is a perspective diagram illustrating a clamp and a phase angle measurement unit in FIG. 3.

The disc assembly 10 includes a spindle motor 12 which is a driving source disposed at a base 11, and discs 14 connected to a rotation unit 13 of the spindle motor 12. In this embodiment, the rotation unit 13 incorporates a rotation shaft 12a of the spindle motor 12 and a hub connected to the rotation shaft 12a. The discs 14 are formed in a multi-layer structure. A single disc 14 may also be used. Spacers 15 are provided between the discs 14. The discs 14 are fixed to the rotation unit 13 by a clamp 16 disposed at the rotation unit 13. The clamp 16 is fixed to the rotation unit 13 by a screw. Accordingly, the clamp 16 is rotated with the rotation unit 13 and the discs 14. As illustrated in FIG. 4, a reference point P is marked on the clamp 16.

The displacement measurement unit 20 measures vibration in the rotation of the disc assembly 10. That is, in the rotation, the disc assembly 10 is repeatedly and/or non-repeatedly biased due to the eccentric mass of the discs 14, thereby causing vibration. The displacement measurement unit 20 measures the biased vibration due to the eccentric mass of the discs 14. More particularly, the displacement measurement unit 20 measures displacement of the rotated disc assembly 10, and thus calculates the vibration thereof. The displacement measurement unit 20 is connected to the operation/control unit 23, transmitting the vibration information to the operation/control unit 23. An amplifier 22 may be provided between the displacement measurement unit 20 and the operation/control unit 23. The amplifier 22 improves, for example, accuracy and reliability of the vibration information transmitted to the operation/control unit 23. The displacement measurement unit 20 is positioned at a predetermined path of a contact or non-contact type assembly and production line of the disc assembly 10. In general, a Gep sensor, acceleration sensor, laser sensor, strain gage, or any other appropriate type of sensor may be used as the displacement measurement unit 20. The phase angle measurement unit 21 simultaneously measures a phase angle of the clamp 16, from the reference point P, when the discs 14 are rotating on the production line of the disc assembly 10.

As depicted in FIG. 4, the phase angle measurement unit 21 is preferably a photo sensor measuring the phase angle by irradiating light toward the reference point P and receiving a reflected light from the clamp 16. However, an appropriate alternative type sensor may be used. In the assembly process of the disc assembly 10, the phase angle measurement unit 21 may be positioned adjacent to the displacement measurement unit 20 so that the vibration and the phase angle can be measured at the same time. In addition, the phase angle measurement unit 21 is connected to the operation/control unit 23, thus transmitting the phase angle information to the operation/control unit 23.

The operation/control unit 23 may be a computer which can operate data and control a mechanical device such as a robot. The operation/control unit 23 calculates the eccentric mass and position of the disc assembly 10 by using the biased vibration information from the displacement measurement unit 20 and the phase angle information from the phase angle measurement unit 21. The eccentric mass and position information of the disc assembly 10 calculated in the operation/control unit 23 are used as reference data for controlling the laser cutter 25 and the dust inhaler 27.

The laser cutter 25 tracks the side portion of the disc 14 corresponding to the eccentric mass position calculated in the operation/control unit 23, and laser-cuts the side portion of the disc 14 corresponding to the calculated eccentric mass. The laser cutter 25 may be installed with the aid of arms of an industrial robot (not shown) controlled by the operation/control unit 23. As an example, the side portion of the disc 14 is cut, but another portion of the disc 14 may be cut to remove the eccentric mass in the alternative.

The dust inhaler 27, illustrated in FIG. 3, may be provided to remove dust generated when, for example, the side portion of the disc 14, namely the rim of the disc 14, is laser-cut. Similarly to the laser cutter 25, the dust inhaler 27 may be installed with the aid of a robot arm and controlled by the operation/control unit 23. Accordingly, the dust inhaler 27 tracks the eccentric position calculated in the operation/control unit 23, namely the cutting position, and inhales dust created during the cutting process. As with the other measurement units 20 and 21, the laser cutter 25 and the dust inhaler 27 are disposed at the production line of the disc assembly 10. Therefore, the eccentric mass of the disc assembly 10 can be balanced to reduce vibration before finishing production of a disc drive using the disc assembly 10, which results in high quality products.

According to an aspect of the present invention, a disc balancing method, using the disc balancing device in accordance with the present invention is provided, and will now be described.

Figure 5:
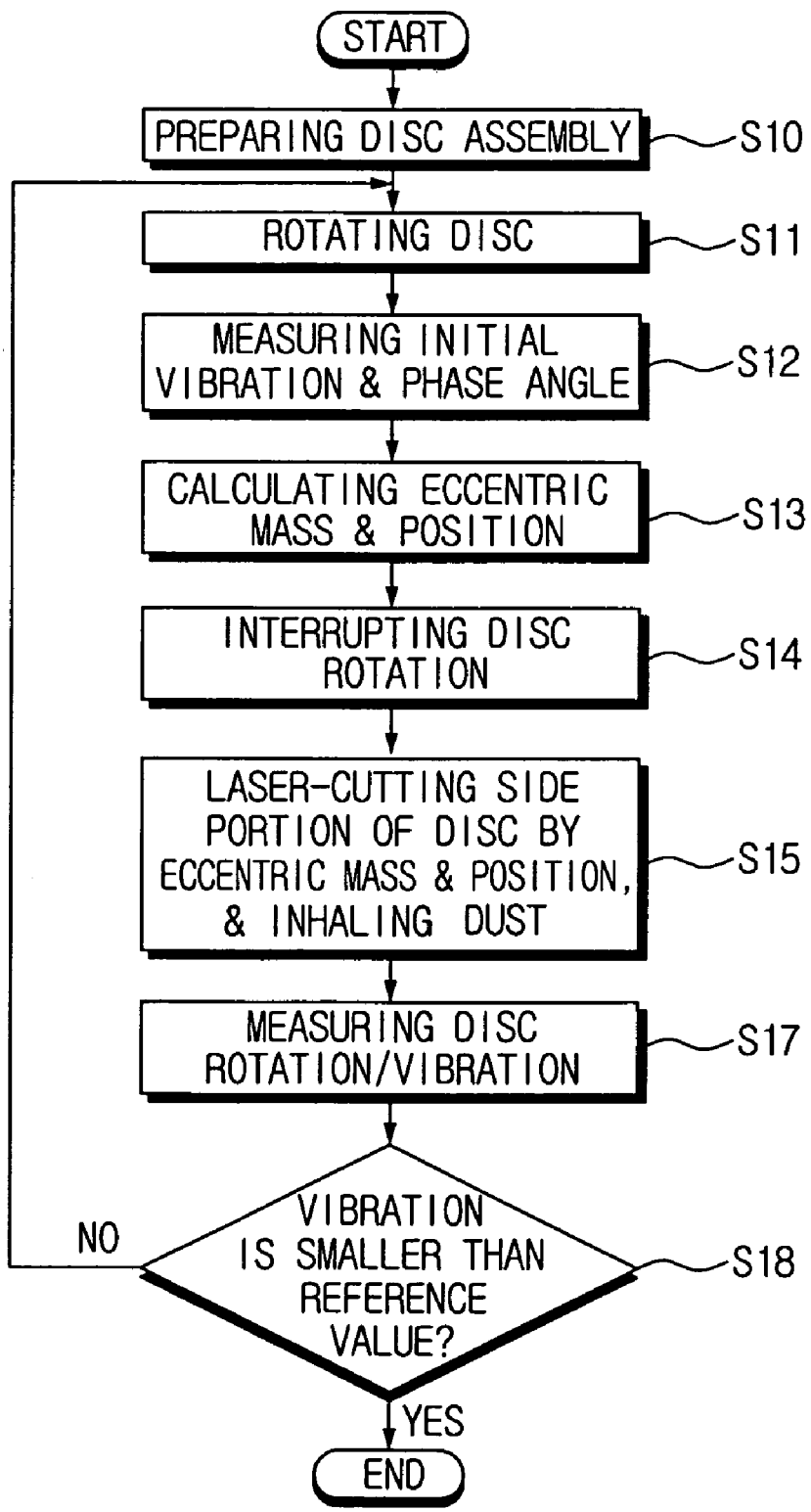
FIG. 5 is a flowchart showing sequential operations of a disc balancing method in accordance with an embodiment of the present invention.
Figure 6:
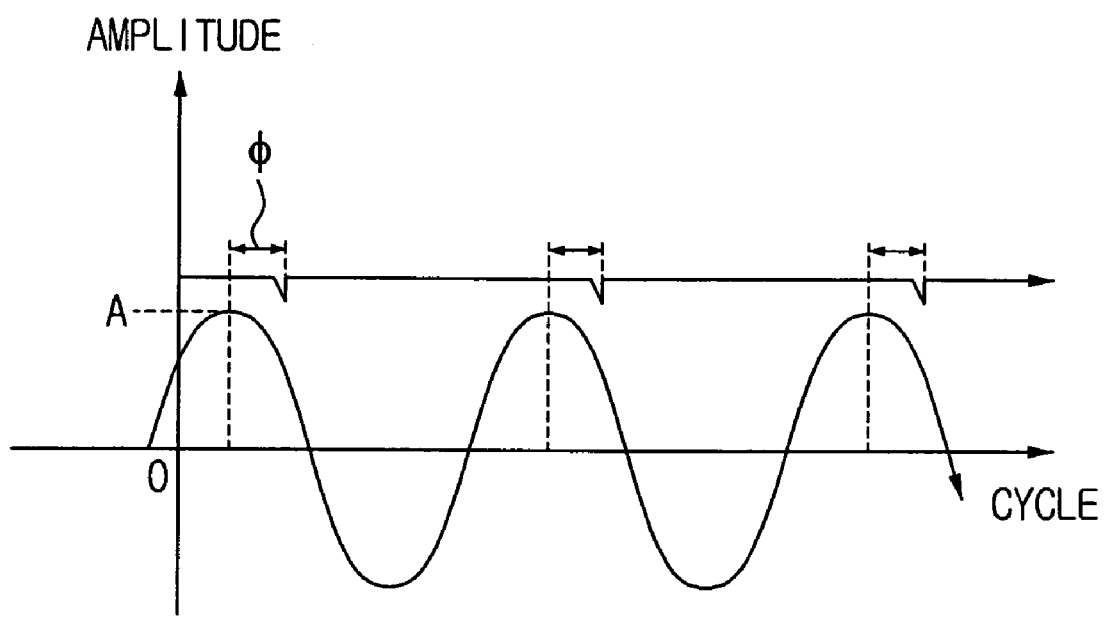
FIG. 6 is a graph showing a phase angle and vibration of the disc measured by the balancing device in FIG. 3.

Referring to FIGS. 3 to 5, the disc assembly 10 is prepared by connecting the discs 14 and the spindle motor 12 in a disc driver assembly process (S10). Here, the discs 14 are fixed to the rotation unit 13 by the clamp 16. Thereafter, the disc assembly 10 is positioned on the production line where the measurement units 20 and 21, the laser cutter 25, and dust inhaler 27 are provided. The disc assembly 10 is rotated at a predetermined speed by driving the spindle motor 12(S11). When the disc assembly 10 is rotated, the displacement measurement unit 20 and the phase angle measurement unit 21 measure an initial vibration and a phase angle (S12). As illustrated in FIG. 6, the displacement measurement unit 20 measures the repeated biased vibration A due to the eccentric mass of the disc assembly 10 in the rotation of the disc assembly 10. In addition, the phase angle measurement unit 21 measures the phase angle from the reference point P on the clamp 16 in a repeated cycle type. Accordingly, the displacement measurement unit 20 measures the phase angle φ between the reference point P and the biased vibration A. The information with respect to the initial vibration, namely the biased vibration A and the information of the phase angle φ, are transmitted to the operation/control unit 23. The operation/control unit 23 calculates the eccentric mass and position of the disc assembly 10 according to the biased vibration A and the phase angle φ (S13). When the eccentric mass and position of the disc assembly 10 are calculated, rotation of the disc 14 is interrupted (S14). Thereafter, the operation/control unit 23 controls driving of the robot (not shown) to move the laser cutter 25 so that the laser light, irradiated from the laser cutter 25, can be focused on the side portion of the disc 14 corresponding to its eccentric position. The operation/control unit 23 also controls the on/off driving of the laser cutter 25 to irradiate the laser light, thereby laser-cutting the side portion of the disc 14 corresponding to the calculated eccentric mass (S15).

When the side portion of the disc 14 is cut as discussed above, dust is generated. In response to the dust created, the operation/control unit 23 also controls positioning and driving of the dust inhaler 27 to inhale the dust (S15). The position tracking and on/off control of the dust inhaler 27 are performed in the same manner as is the laser cutter 25.

As discussed earlier, the eccentric mass of the disc assembly 10 is precisely removed by laser-cutting the side portion of the disc 14, and thus the eccentric vibration is efficiently prevented. As compared with the conventional methods, the discs 14 used in the present invention need not be re-assembled due to removing the eccentric mass of the completely-assembled disc assembly 10. In addition, with the present invention as described, contamination of the production line of the disc assembly 10 and the discs 14 is prevented by inhaling dust with the aid of the dust inhaler 27 in the cutting process.

After laser-cutting the side portion of the disc 14, the disc assembly 10 is re-rotated, and vibration is re-measured by the displacement measurement unit 20 (S17). The operation/control unit 23 receives the vibration information, and compares the vibration with a predetermined reference value (S18). If the measured vibration is greater than the predetermined reference value, the above steps S11 to S17 are repeated until the vibration is smaller than the predetermined reference value. When the measured vibration is smaller than the predetermined reference value, the eccentric mass balancing process of the disc, namely the disc assembly 10, is finished. As described above, the vibration of the disc assembly 10 may be measured and laser-cut several times, thereby improving precision of the balancing process. Accordingly, inferiority of the products is reduced, and recording density of the disc 14 is increased by reducing vibration in the rotation of the disc assembly 10.

In accordance with the present invention, the disc balancing process is easily performed without dissembling or re-assembling the disc assembly. Moreover, since vibration measurement and laser cutting process may be repeated several times, inferiority of the disc drive using the disc assembly such as the HDD is reduced, and recording density of the disc is increased.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A disc balancing device which balances a disc comprising:
    a disc assembly having a driving source, and a computer readable disc for storing data thereon driving source;
    a displacement measurement unit measuring vibration in the rotation of the disc assembly;
    a phase angle measurement unit measuring a phase angle from a reference point of the disc assembly in the rotation of the disc assembly;
    an operation/control unit calculating an eccentric mass and an eccentric position of the disc assembly, by using the biased vibration measured in the displacement measurement unit and the phase angle measured in the phase angle measurement unit; and
    a laser cutter moving to track and to laser-cut a side portion of the disc corresponding to the eccentric position, while the disc is not rotating, according to the eccentric mass information from the operation/control unit, wherein the eccentric mass of the disc assembly is balanced to reduce vibration in the rotation thereof.

2. The device according to claim 1, further comprising a dust inhaler inhaling dust generated when the side portion of the disc is cut by the laser cutter.

3. The device according to claim 2, further comprising a robot unit, wherein the dust inhaler and the laser cutter are moved by the robot unit controlled by the operation/control unit, to track the eccentric position.

4. The device according to claim 1, wherein the phase angle measurement unit is a photo sensor measuring the phase angle by irradiating light to the reference point and receiving a reflection light from the disc assembly.

5. A disc balancing device comprising:
    a disc assembly having a driving source and computer readable for storing data thereon disc rotatably disposed at the driving source;
    a measurement unit measuring an eccentric portion of the at least one disc; and
    a laser cutter moving to cut a portion of the disc corresponding to the measured eccentric portion, while the disc is not rotating.

6. The device according to claim 5, wherein:
    a plurality of discs is rotatably disposed at the driving source;
    the measurement unit measures an eccentric portion of the discs; and
    the laser cutter moves to cut a portion of the discs corresponding to the measured eccentric portion, while the discs are not rotating.

7. The device according to claim 1, wherein the device balances a plurality of discs, wherein:
    the discs are rotatably disposed at the driving source; and
    the laser cutter tracks and laser-cuts side portions of the discs corresponding to the eccentric position according to the eccentric mass information from the operation/control unit, wherein the eccentric mass of the disc assembly is balanced to reduce vibration in the rotation.

* * * * *

UNITED STATES PATENT AND TRADEMARK OFFICE
CERTIFICATE OF CORRECTION

PATENT NO. : 7,020,950 B2 Page 1 of 1
APPLICATION NO. : 09/955061
DATED : April 4, 2006
INVENTOR(S) : Hong et al.

It is certified that error appears in the above-identified patent and that said Letters Patent is hereby corrected as shown below:

In column 6, line 8, insert --is rotatably disposed at--before "driving source".
In column 6, line 38-39, after "and", delete "computer...disc" and insert therefor --at least one computer readable disc for storing data thereon--.

Signed and Sealed this

Twenty-fourth Day of October, 2006

JON W. DUDAS
*Director of the United States Patent and Trademark Office*